United States Patent [19]

Omata

[11] Patent Number: 4,697,673
[45] Date of Patent: Oct. 6, 1987

[54] ONE-WAY DAMPER

[75] Inventor: Nobuaki Omata, Yokohama, Japan

[73] Assignee: Nifco Inc., Yokohama, Japan

[21] Appl. No.: 945,220

[22] Filed: Dec. 22, 1986

Related U.S. Application Data

[63] Continuation of Ser. No. 754,060, Jul. 12, 1985, abandoned.

[30] Foreign Application Priority Data

Jul. 16, 1984 [JP] Japan ............................. 59-146070

[51] Int. Cl.$^4$ ........................................ F16D 57/02
[52] U.S. Cl. ........................................ 188/291; 16/52;
16/85; 188/290; 192/12 BA; 192/58 B;
267/155
[58] Field of Search ............ 188/290, 291, 296, 322.5,
188/82.1, 381, 306, 271, 281; 16/52, 72, 82, 85;
192/12 BA, 58 B, 41.5; 267/155

[56] References Cited

U.S. PATENT DOCUMENTS

| | | | |
|---|---|---|---|
| 1,594,301 | 7/1926 | Heymer | 267/155 |
| 1,979,869 | 11/1934 | Charter | 267/155 X |
| 2,685,208 | 8/1954 | Lundquist | 192/41.5 X |
| 3,118,167 | 1/1964 | Morris et al. | 188/291 X |
| 3,861,503 | 1/1975 | Nash | 188/276 |
| 4,069,545 | 1/1978 | Holet et al. | 188/291 X |
| 4,342,135 | 8/1982 | Matsuo et al. | 16/82 |
| 4,426,752 | 1/1984 | Nakayama | 16/82 |
| 4,527,675 | 7/1985 | Omata et al. | 188/322.5 X |
| 4,565,266 | 1/1986 | Omata | 188/322.5 |

FOREIGN PATENT DOCUMENTS

| | | | |
|---|---|---|---|
| 890149 | 8/1953 | Fed. Rep. of Germany | 267/155 |
| 189843 | 12/1983 | Japan . | |
| 242764 | 11/1925 | United Kingdom | 267/155 |

Primary Examiner—George E. A. Halvosa
Attorney, Agent, or Firm—Trexler, Bushnell, Giangiorgi & Blackstone, Ltd.

[57] ABSTRACT

A one-way damper has a rotor which is provided with a braking disc at one of its ends. The braking disc is received in a housing of the damper and the housing is filled with oil. The other end of the rotor extends outward from the housing and has a gear loosely mounted thereon. The gear is engaged with a coil spring. When the gear rotates in one direction, the coil spring is reduced in diameter so that it grips the rotor, making it possible for the torque of the gear to be transmitted to the rotor through the coil spring. When the gear rotates in the other direction, the coil spring is expanded in diameter so that it does not grip the rotor, making it possible for the gear to turn freely. The one-way damper is used in association with a lid or door to damp one but not the other of the opening and closing operations.

4 Claims, 14 Drawing Figures

ONE-WAY DAMPER

This application is a continuation of application Ser. No. 754,060, filed July 12, 1985, now abandoned.

BACKGROUND OF THE INVENTION

1. Field of the Invention

The present invention relates to an oil-type one-way damper for producing a braking action with respect to a lid during either opening or closing thereof.

2. Description of the Prior Art

Oil-type dampers are widely used in, for example, audio and video tape recorders in order to effectively reduce vibration and shock produced when a cassette tape holder is projected outward from the recorder from its initially retracted position so that smooth motion of the holder is obtained. Such an oil-type damper is disclosed in, for example, U.S. Pat. Nos. 3,861,503, 3,882,976, 4,342,135 and 4,426,752. In all of the dampers disclosed in these U.S. patents, a rotor is rotatably incorporated in a housing of the damper and a clearance between the housing and the rotor is filled with oil so that rotational motion of the rotor is regulated by the resistance resulting from the viscosity of the oil. In the Japanese Utility Model Public Disclosure No. SHO 58-189843, the present inventor has proposed a damper having a housing in which a soft and flexible diaphragm with good resiliency is incorporated together with a rotor so that the thermal expansion of the oil contained in the housing is absorbed by the flexible diaphragm, whereby the oil is prevented from leaking out of the housing.

However, in this type of damper, since the resilient force of a spring or the like is used only for projecting the cassette tape holder from the main body of the recorder, it is necessary for the damper to apply a braking action to the holder only when the holder is being urged outwardly by the spring while such braking action is neither required or desirable when the holder is being pushed inward against the spring. More specifically, since the user has to push the holder by hand when retracting it into the main body of the recorder, if the braking action is also effective at a time when the holder is pushed into the main body of the recorder, the user is undesirably required to exert a larger pushing force on the holder than when no braking is applied.

Thus, is some cases, it is preferable that the braking action be effective in only one direction of movement and not be effective in the other so that resistance to movement in the other direction is reduced as much as possible. However, in the conventional oil-type damper, such braking action is effective in both the normal and the reverse directions of rotation of the rotor. This is a defect inherent in the conventional damper.

SUMMARY OF THE INVENTION

It is an object of the present invention to provide an oil-type damper for producing a braking action in only the opening operation or in only the closing operation of a lid, door or the like, which damper enables the resistance to movement in other (non-braked) operation to be reduced, is simple in construction, and is reliable in operation.

In order to accomplish the above object of the present invention, the oil-type damper of the present invention comprises: a housing; a rotor which is received in the housing and has one end of its axle extending outward from the housing; and a gear for transmitting torque of the rotor, into which gear is inserted said one end of the axle of the rotor, characterized in that the damper further comprises a coil spring into which the axle of the rotor is inserted, and one end portion of the coil spring is engaged with the gear so that a rotational movement of the gear in one direction causes the coil spring to be reduced in its diameter, whereby the torque of the gear is transmitted to the axle of the rotor through the coil spring, while a rotational movement of the gear in the other direction causes the coil spring to be expanded in its diameter so that the gear slips with respect to the axle of the rotor.

In this construction, when the gear rotates in one direction, the axle of the rotor is gripped by the coil spring so that the rotor is rotated by the gear through the coil spring in an integral manner, whereby the rotor is subjected to the braking action caused by the viscosity of an oil or the like while the rotor is rotated.

On the other hand, when the gear rotates in the other direction, the gear is allowed to rotate freely together with the coil spring around the axle of the rotor, because inner diameter of the coil spring is slightly expanded, whereby the torque of the gear is not transmitted to the rotor so that the braking action of the oil is not produced at the time the gear rotates in the other direction.

BRIEF DESCRIPTION OF THE DRAWINGS

Other objects and features of the present invention will be hereinafter described in the description of the preferred embodiments with reference to the accompanying drawings.

DESCRIPTION OF THE PREFERED EMBODIMENTS

The present invention will now be described with reference to illustrate embodiments thereof.

Figure 1:
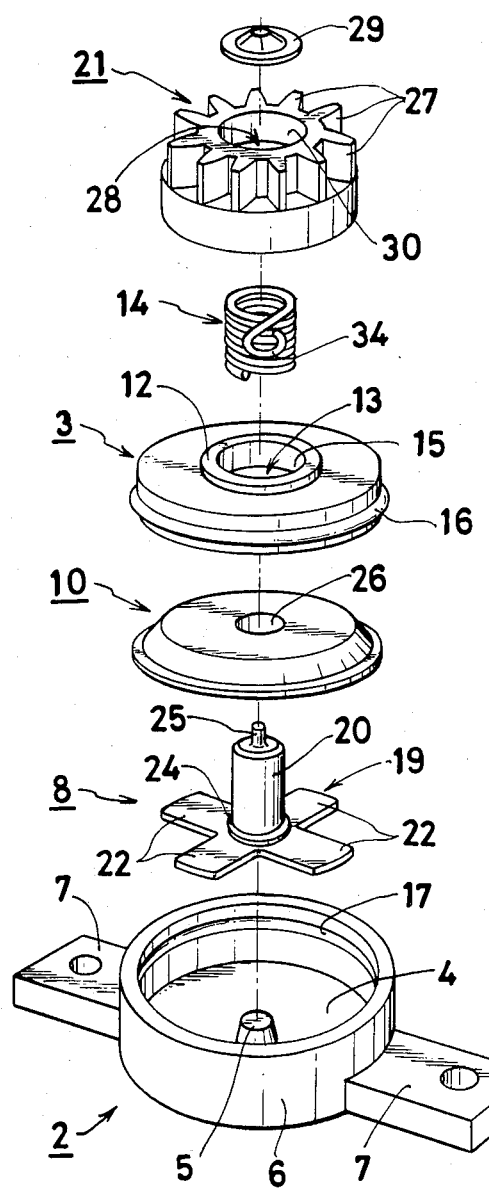
FIG. 1 is an exploded perspective view of an embodiment of the present invention.
Figure 2:
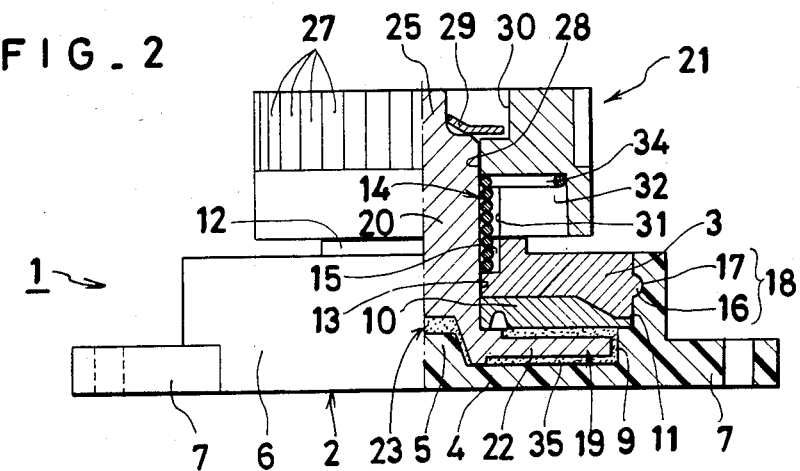
FIG. 2 is a partial sectional side view of the same embodiment of the present invention in the assembled state.
Figure 5:
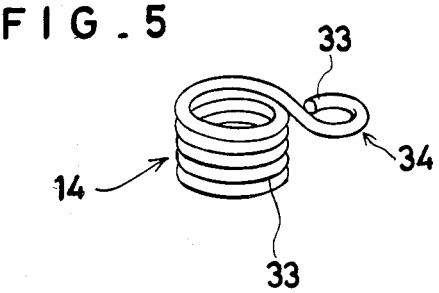
FIG. 5 is a perspective view of a coil spring.
Figure 6:
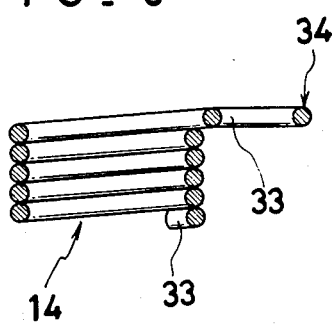
FIG. 6 is a longitudinal sectional view of the coil spring shown in FIG. 5.
Figure 7:
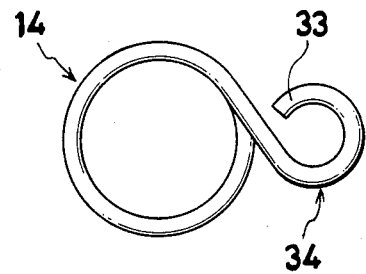
FIG. 7 is a plan view of the coil spring shown in FIG. 5.

The reference numeral 1 in FIG. 2 designates an oil type of a damper of the present invention. The damper 1 comprises a base element 2 which forms a cylindrical housing and is made of plastic and a cap 3 which is insertedly mounted on the base element 2. The base element 2 of the damper 1 is integrally provided with a bottom wall 4; a thick frustoconical projecting portion 5 projecting upward from a central portion of the inner surface of the bottom wall 4, which projecting portion 5 has an expanding circular base; a cylindrical wall 6 longitudinally extending upward from the outer periphery of the bottom wall 4; and mounting pieces 7 for fixing the damper 1 to the instrument in which it is to be used. The mounting pieces 7 extend outward from the outer periphery of the cylindrical wall 6 so that they extend in opposite directions to each other. Within the space defined by the cylindrical wall 6 are formed: a shallow first housing portion 9 adjacent to the bottom wall 4 for receiving a rotor 8 (see FIG. 1); and a second housing portion 11 for receiving a flexible diaphragm 10 and the cap 3. The second housing portion 11 has a slightly larger diameter than that of the first housing portion 9 and extends vertically from the first housing portion 9 to the upper open end of the cylindrical wall 6.

The cap 3 has a thickness suitable for insertion into the second housing portion 11 along the inner periphery thereof, and has a circular boss portion 12 at the central portion of its upper surface. The boss portion 12 extends longitudinally upward and surrounds a central through-hole 13.

On the inner wall of the central through-hole 13 is provided an annular step portion 15 adjacent to the end surface of the boss portion 12. The annular step portion 15 is larger in diameter than the central through-hole 13 and accommodates coil spring 14.

Further, the inner periphery of the second housing portion 11 and the outer periphery of the cap 3 are provided with an annular groove 17 and an annular projection 16, respectively. The annular groove 17 and the annular projection 16 snappingly engage with each other to form a snap-type engaging device 18 when the cap 3 is forcibly inserted into the second housing portion 11 along its inner periphery so as to close the upper open end of the cylindrical wall 6.

The rotor 8 consists of a braking disc 19 and an axle 20 projecting from the central portion of one surface of the braking disc 19. The axle 20 passes through the central through-hole 13 of the cap 3 so as to entend from the inside of the cap 3 to beyond the upper edge of the boss portion 12. On the projecting end of the axle 20 is loosely mounted a gear 21. The outer diameter of the braking disc 19 is slightly smaller than the inner diameter of the first housing portion 9.

In this embodiment, as shown in FIG. 1, the braking disc 19 consists of four vanes 22 each of which extends radially outward from the axle 20 so that the shearing area of the oil received in the base element 2 is enlarged, whereby the resistance attributable to the viscosity of the oil is increased. It should be noted, however, that the shape of the braking disc 19 is not limited to that shown and it is possible for the braking disc 19 to have a circular shape, or a shape in which a plurality of radial through-holes or projections are provided. At the central portion of the lower surfaces of the braking disc 19, i.e. the surface opposite that on which the axle 20 is provided, there is provided a concave insertion portion 23 into which the projecting portion 5 of the bottom wall 4 of the base element 2 fits so as to prevent the rotor 8 from swinging laterally relative to its rotational center.

The axle 20 is shaped as a circular column and has at its base end a circular stepped boss portion 24 and at its upper end a tip 25 shaped as a circular column with a diameter smaller than that of the middle portion of the axle 20.

The flexible diaphragm 10 is made soft and resilient so as to deform under the effect of the thermal expansion of the oil pushing against it. This enables the base element 2 to be charged with a larger amount of the oil than would otherwise be possible. To provide such flexibility, the diaphragm 10 is made of thin synthetic rubber or soft plastic, preferably of such a material that undergoes little change in its properties under heating, typical examples being polyethylene, polypropylene and the like. In this embodiment, the flexible diaphragm 10 is formed into a thin doughnut-like shape of gradually reduced thickness in the radial direction from its middle portion to its outer peripheral edge.

Further, the outer diameter of the flexible diaphragm 10 is substantially identical with the inner diameter of the cylindrical wall 6. In this embodiment, the flexible diaphragm 10 is inserted into the second housing portion 11 of the cylindrical wall 6 so that its outer peripheral edge is brought into contact with the inner surface of the second housing portion 11, whereby the flexible diaphragm 10 can be fixed within the second housing portion 11 by snapping the cap 3 into the annular groove 17. As a result, a prescribed amount of clearance is provided and maintained between the flexible diaphragm 10 and the braking disc 19 by the provision of the second housing portion 11 and the stepped boss portion 24 of the axle 20.

Figure 3:
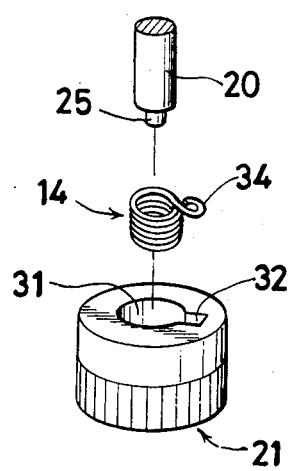
FIG. 3 is an exploded perspective view of one part of the same embodiment of the present invention, showing a rotor axle, a coil spring and a gear.
Figure 4:
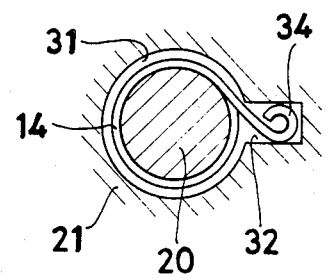
FIG. 4 is a cross-sectional view of the same part as shown in FIG. 2.

The gear 21 has a circular column shape, with the upper half being formed into a gear portion 27 in its outer periphery. In the central portion of the gear 21 is provided a circular through-hole 28 provided near its upper open end with an annular recess 30 into which is inserted a push-nut 29 for retaining the gear 21 on the axle 20 by engagement with the tip 25. On the other hand, in the lower open end of the through-hole 28 is formed an annular housing groove 31 into which the coil spring 14 is inserted. The groove 31 has a larger diameter than the through-hole 28 and extends vertically from the lower end of the gear 21 to the middle portion of the same. As shown in FIG. 3, the housing groove 31 is provided with an engaging groove 32 formed in its inner wall so as to extend radially outward.

· The coil spring 14 is formed from a single spiral wire 33 wound in a coil-like manner. The inner diameter of the coil spring 14 is substantially identical with the outer diameter of the axle 20 and one of its ends is tangentially extended. The tip end of the extended end is bent in the reverse direction to the winding direction of the coil spring 14 so as to form a hook-shaped engaging portion 34 which is inserted into the engaging groove 32.

In assembling of the damper 1, the axle 20 of the rotor 8 is inserted into the through-hole 26 of the flexible diaphragm 10, and then inserted into the central through-hole 13 of the cap 3 from the bottom thereof so as to project beyond the top of the boss portion 12 of the cap 3. At this point, a suitable oil 35 such as a silicone grease is applied to the braking disc 19 of the rotor 8, and then the braking disc 19 and the flexible diaphragm 10 are inserted into the first housing portion 9 and the second housing portions 11 of the base element 2, respectively, both of which portions 9 and 11 are disposed within the cylindrical wall 6 of the base element 2, so that the braking disc 19 and the flexible diaphragm 10 are integrally received within the cylindrical wall 6. Thereafter, the cap 3 is forcibly inserted into the inside of the cylindrical wall 6 along the inner surface of the same 6, whereby the cap 3 is fixed to the base element 2 through the snap engagement device 18 so as to form the first and the second housing portions 9 and 11 in the base element 2.

Then, the projecting end of the axle 20 of the rotor 8 is inserted into the coil spring 14 with the engaging portion 34 of the coil spring 14 directed upward. At this time, the engaging portion 34 of the coil spring 14 is aligned with the engaging groove 32 of the gear 21, and then the gear 21 is positioned above the axle 20 of the rotor 8 and is lowered thereonto so that the axle 20 of the rotor 8 is inserted into the gear 21. Thereafter, the push-nut 29 is pushed onto the tip 25 of the axle 20, which end portion 25 projects into the annular recess 30 of the gear 21, so that the gear 21 is retained on the axle 20 of the rotor 8.

In use, the damper 1 is fixed to the case of an instrument such as a tape recorder by means of its mounting pieces 7, with the gear 21 in mesh with a suitable gear, such as a rack, a sector gear, a spur gear or the like, which moves in unison with a cassette tape holder of the recorder.

To simplify the description of the operation of the present invention, it is assumed that the coil spring 14 is wound as a left-hand helix. In this case the operation of the diaphragm 10 is as follows:

When the gear 21 turns clockwise as viewed from the top in FIG. 1, the clockwise torque of the gear 21 is transmitted to the coil spring 14 so that the coil spring 14 is slightly twisted to be reduced in inner diameter, whereby the coil spring 14 clamps the outer periphery of the axle 20 of the rotor 8. As a result, the rotor 8 is rotated in the same direction as the gear 21 through the coil spring 14. When the rotor 8 is rotated as described above, its movement is damped by the resistance of the viscous oil 35 which, being present in the clearance defined by the bottom wall 4 of the base element 2, the inner peripheral surface of the cylindrical wall 6 and the surface of the flexible diaphragm 10, adheres to the braking disc 19 of the rotor 8. As a result, the movement of the cassette tape holder or the like is also damped. When ambient temperature increases so that the volume of the oil 35 increases, the flexible diaphragm 10 is pushed by the oil 35 so that it expands slightly toward the cap 3 so as to absorb the expansion of the oil 35, whereby the oil 35 is prevented from leaking out of the housing, i.e. the base element 2.

In contrast with the above, when the gear 21 rotates counterclockwise, the counterclockwise torque of the gear 21 is transmitted to the coil spring 14 so that the coil spring 14 is slightly expanded in its diameter, causing it to slip around the axle 20 of the rotor 8. As a result, the rotor 8 is not rotated. Therefore, the gear 21 can freely rotate so that the cassette tape holder is not subjected to a braking action when it is retracted into the case of the recorder.

Figure 8:
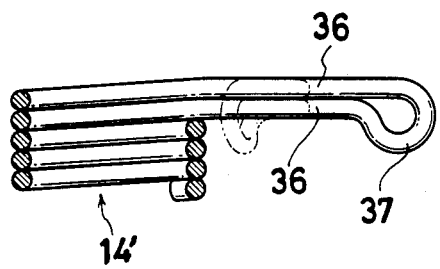
FIG. 8 is a side view of a second embodiment of the coil spring before being bent laterally at its bending end.
Figure 9:
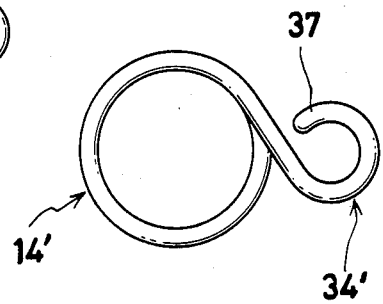
FIG. 9 is a plan view of the second embodiment of the coil spring after being bent laterally at its bending end.

FIGS. 8 to 14 show other embodiments of the coil spring 14. FIGS. 8 and 9 show a second embodiment 14' of the coil spring formed from double spiral wires wound in a coil-like manner. The double spiral wires are formed from a relatively thin wire material which is bent at its middle portion into its two halves 36, 36, with a bending end 37 of the two halves 36 projecting tangentially outward. The leading end of bending end 37 is vertically bent to form a ring-like shape and is laterally bent to form an engaging portion 34' having a substantially hook-like shape.

Figure 10:
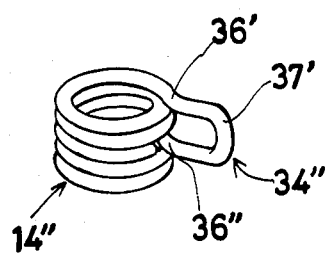
FIG. 10 is a perspective view of a third embodiment of the coil spring.
Figure 11:
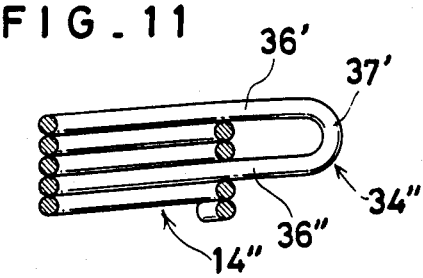
FIG. 11 is a side view of the third embodiment of the coil spring shown in FIG. 10.
Figure 12:
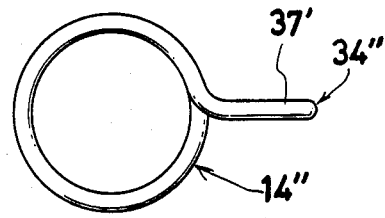
FIG. 12 is a plan view of the third embodiment of the coil spring shown in FIG. 10.

FIGS. 10 to 12 show a third embodiment 14" of the coil spring formed from a two-stage winding of a relatively thin wire wound in a coil-like manner. The two-stage winding consists of upper and lower windings which are formed from halves 36', 36" of the thin wire material by bending the thin wire material at substantially the middle portion thereof as is in the case of the second embodiment of the coil spring 14. In this arrangement, the end portion of the upper winding is adjacent to the start portion of the lower winding, and a bending end 37' extends radially outward to form an engaging portion 34".

Figure 13:
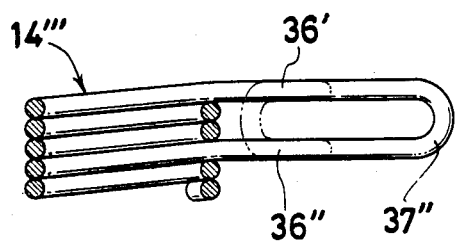
FIG. 13 is a longitudinal sectional view of a fourth embodiment of the coil spring before being bent laterally at its bending end.
Figure 14:
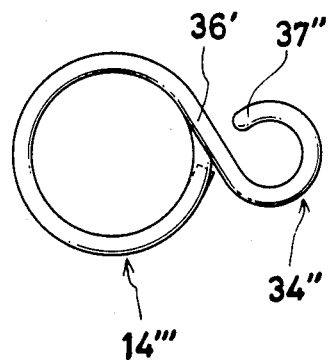
FIG. 14 is a plan view of the fifth embodiment of the coil spring shown in FIG. 13 after being bent at its bending end.

FIGS. 13 and 14 show a fourth embodiment 14''' of the coil spring. This fourth embodiment 14''' is substantially identical with the third embodiment 14" of the coil spring except that the bending end 37" of the fourth embodiment extends tangentially outward and is bent laterally at its leading end to form an engaging portion 34''' having a substantially hook-like shape.

It is possible to use any one of the second, third and fourth embodiments 14', 14" and 14''' in place of the coil spring 14 in the damper 1 of the first embodiment of the present invention so that the same effect as that of the coil spring 14 is obtained. Since each of the engaging portions 34', 34" and 34''' of the second, third and fourth embodiments 14', 14" and 14''' is formed from double wires, these embodiments 14', 14" and 14''' have remarkably improved strength. In addition, in the second and the fourth embodiments 14' and 14''', since the engaging portions 34' and 34''' extend tangentially, the curvature of their foot portions is small so that it is possible to prevent the concentration of stress in these engaging portions 34' and 34'''. Further, in the second and the fourth embodiments 14' and 14''', since the leading ends of the engaging portions 34' and 34''' are bent to form the hook-like shape, it is possible to prevent them from coming out of the engaging groove 32 of the gear 21.

As described above, according to the present invention, the axle 20 of the rotor 8 is inserted into the coil spring 14, 14', 14" or 14''', and one of the end portions of the coil spring is engaged with the gear 21 from which torque is transmitted to the rotor 8, whereby it is possible for the present invention to provide a one-way damper 1 which has a remarkably simple construction and produces a damping effect in one direction of movement but not in the other.

What is claimed is:

1. A one-way type of a damper comprising: a housing provided with a sleeve-like base element and a bottom wall said bottom wall having a centrally disposed frustoconical upward projection thereon and an upwardly facing surface outwardly of said projection; a rotor which has an axle and a braking disc at one end of said axle, the disc being contained in said housing together with a damping oil, the other end of the axle extending outward from said housing, and having a gear mounted thereon for rotation relative thereto, said axle at said one end having a recess receiving said projection for centralizing said axle, said one end of said axle having an annular portion below said disc and substantially engaging said upwardly facing surface, said axle having a boss extending above said disc; said housing including a cap with a central opening through which said axle extends, and a resilient diaphragm in said housing beneath said cap and substantially engaging said boss, said damping oil being disposed below said diaphragm on either side of said disc and in said recess; said gear having an axial bore therethrough and a counter-bore therein, and a coil spring into which said axle of said rotor is inserted, said spring fitting within said counterbore and snugly embracing and engaging said axle, one end portion of said coil spring being fixed to said gear, the coil spring being reduced in diameter when said gear rotates in one direction and being expanded in diameter when said gear rotates in the other direction; whereby said gear transmits torque to said rotor through said coil spring when said gear rotates in said one direction but not when said gear rotates in said other direction.

2. The one-way type of the damper as set forth in claim 1, wherein: said gear is provided with a radial and axially extending slot of limited circumferential extent and opening into said counter-bore, and wherein said coil spring is formed from a single spiral of wire one end of which is bent in the direction reverse to the winding direction of said coil spring and fitting snugly in said slot to fix said end of said spring to said gear.

3. The one-way type of the damper as set forth in claim 1, wherein:

said coil spring is formed from a double spiral winding which is formed from two halves of a wire material bent at its middle portion to form said two halves thereof, a bending portion of the double spiral winding being bent in the direction reverse to the winding direction of said double spiral winding.

4. The one-way type of the damper as set forth in claim 1, wherein:

said coil spring is formed from a two-stage winding of a wire material, which two-stage winding is formed from two halves of said wire material by winding each of said halves individually of the same hand into each stage winding of said two-stage winding and stacking the thus wound stages on each other, a bending end of said two-stage winding being bent in the direction reverse to the winding direction of said two-stage winding.

* * * * *